Dec. 25, 1951     E. M. HUNT     2,579,495
LEAKAGE TESTING APPARATUS
Filed Sept. 27, 1945     2 SHEETS—SHEET 1

INVENTOR
EVERETT M. HUNT

BY Ralph L. Chappell
ATTORNEY

Dec. 25, 1951   E. M. HUNT   2,579,495
LEAKAGE TESTING APPARATUS
Filed Sept. 27, 1945   2 SHEETS—SHEET 2
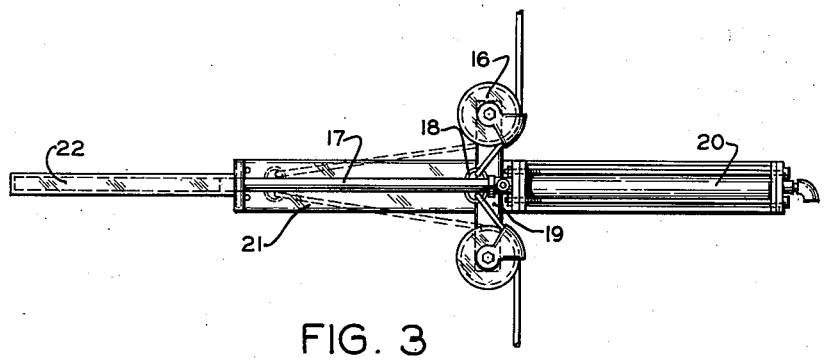
FIG. 3
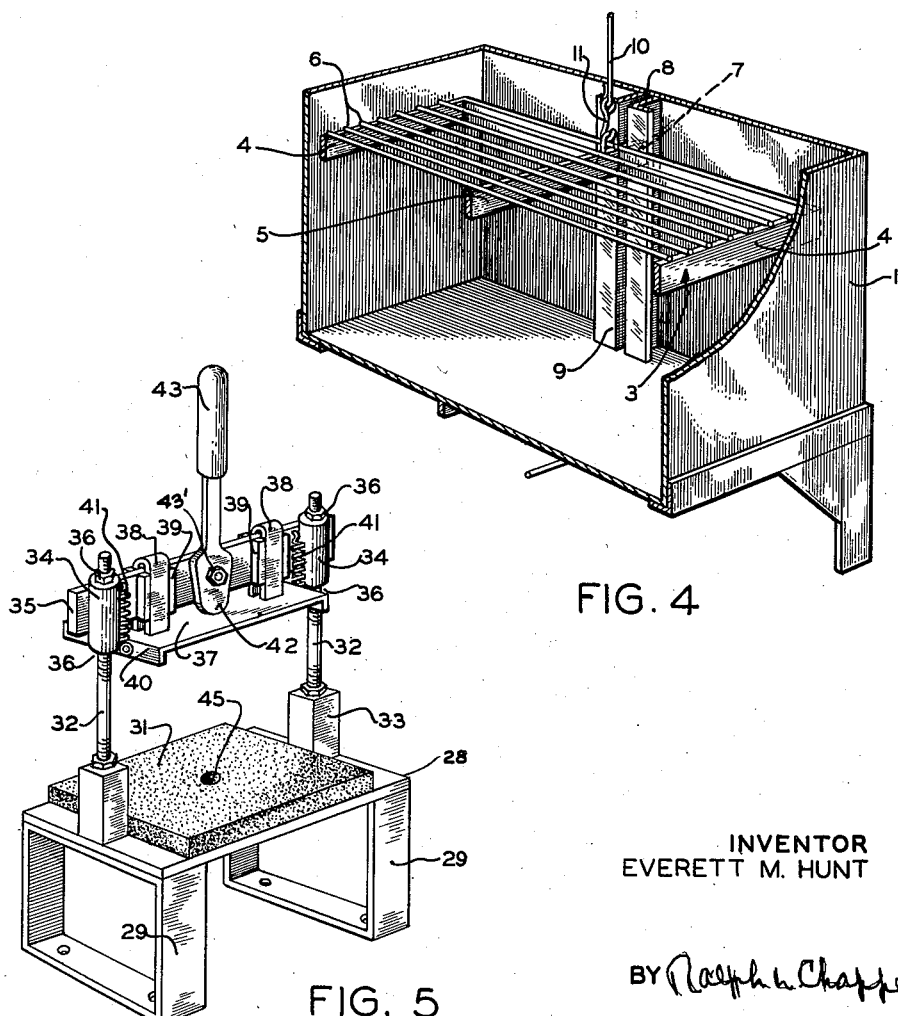
FIG. 4
FIG. 5
INVENTOR
EVERETT M. HUNT
BY Ralph L. Chappell
ATTORNEY Patented Dec. 25, 1951

2,579,495

UNITED STATES PATENT OFFICE 2,579,495

LEAKAGE TESTING APPARATUS

Everett M. Hunt, Portsmouth, N. H.

Application September 27, 1945, Serial No. 619,004

2 Claims. (Cl. 73—40)

(Granted under the act of March 3, 1883, as
amended April 30, 1928; 370 O. G. 757)

My invention relates to testing apparatus. It has to do, more particularly, with apparatus for testing hollow articles to determine whether or not they are fluid-tight.

It is desirable to test certain articles, such as electric conduit boxes which are used in submarines, to determine whether or not they are fluid-tight. In the past this has been done by a hand method.

The object of this invention is to provide simple but effective apparatus for readily determining whether or not a hollow article is fluid-tight.

The preferred embodiment of my invention is illustrated in the accompanying drawings wherein:

Fig. 3 is a bottom plan view taken substantially along line 3—3 of Fig. 1.

Fig. 4 is a perspective view of a portion of the interior of the testing tank and elevator.

Fig. 5 is a perspective view of the box clamping device of my apparatus.

Figure 1:
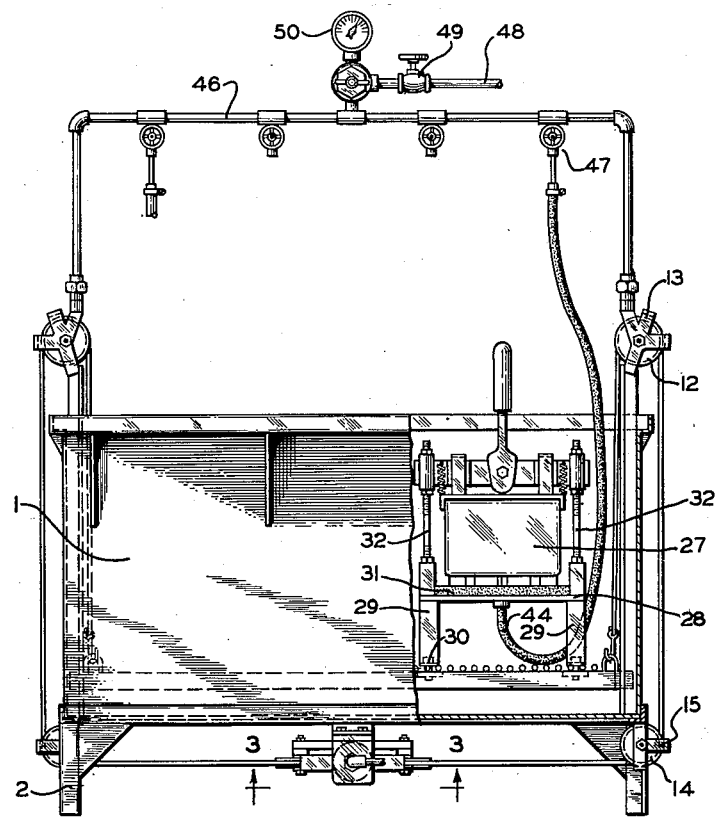
Fig. 1 is a front elevational view, partly cut away, of apparatus constructed in accordance with my invention.

With reference to the drawings I have illustrated my testing apparatus as comprising a liquid tank 1 (Figs. 1, 2 and 4) formed of metal and supported by the legs 2. Within the tank 1 there is mounted a vertically movable elevator 3.

The elevator 3 (Fig. 4) is in the form of a grill composed of longitudinally extending side bars 4 and a middle bar 5 to which a series of transverse bars 6 are welded in longitudinally spaced relationship. The bar 5 projects at each end beyond the main part of the grill to provide a guide 7 which fits into a vertical guideway 8 formed by a pair of angle irons 9 which are welded to the end of the tank 1.

The elevator 3 is moved vertically in the tank by means of a cable 10 attached to each end of the bar 5 by a hook and eye unit 11. Each of the cables 10 passes upwardly around a vertical pulley 12 (Figs. 1 and 2) which is carried by a bracket 13 at a point spaced above the tank 1. The bracket 13 is secured on the upper ends of the angle irons 9 which extend a sufficient distance above the upper edge of the tank. The cable 10 passes downwardly along the end of the tank and then horizontally around a vertical pulley 14. The pulley 14 is rotatably supported by a bracket 15 which is attached to the bottom of the tank midway between its side edges. The cable 10 continues along the bottom of the tank and around a horizontally disposed pulley 16 and its end is connected to a piston rod 17 by means of an eye 18. The two pulleys 16 are carried by a bracket unit 19 which is associated with a cylinder and piston unit 20 and which includes the piston rod 17.

The unit 20 is carried by a shelf 21 which is secured in spaced relationship to the bottom of the tank and to which the bracket 19 is also secured. This shelf 21 carries a guide or a housing 22 projecting beyond the tank in which the outer end of piston rod 17 reciprocates. Flexible air lines 23 and 24 connect the unit 20 with a suitable control valve 25 which is attached to the tank. A line 26 leads from a suitable source of air under pressure to the valve 25.

It will be apparent that if the unit 20 is actuated properly by controlling the valve 25, the elevator 3 will be raised and lowered in the tank 1 through the medium of the connecting operating cables 10.

Figure 2:
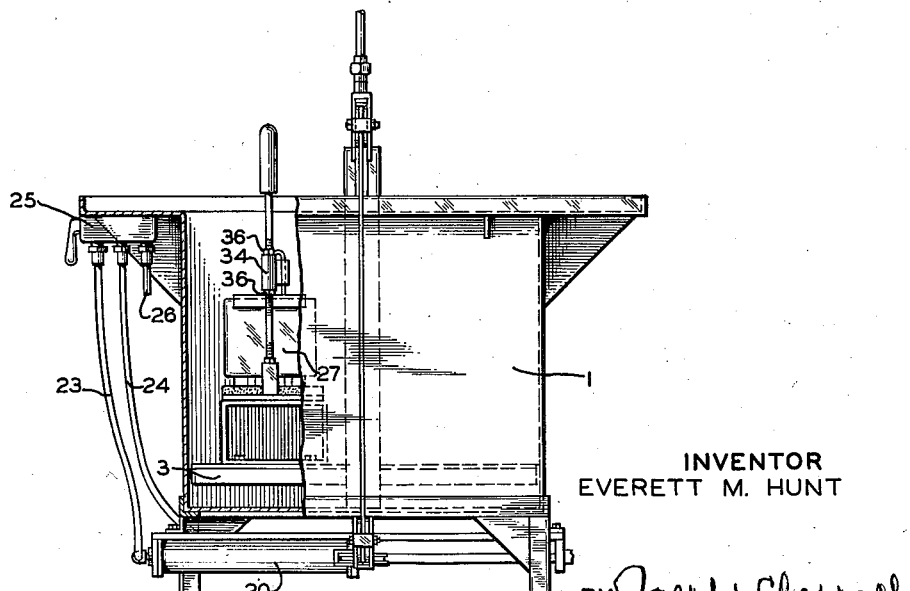
Fig. 2 is an end elevational view, partly cut away, of the apparatus shown in Fig. 1.

As previously indicated, this apparatus is particularly useful for testing electric conduit boxes to determine whether or not they are fluid-tight. These boxes usually have one side open or a series of openings in one side. In Fig. 1 I have illustrated, for example, an electric box 27 being tested.

In order to support the electric box to be tested, I provide a supporting shelf 28 (Fig. 5) which is welded to the top surfaces of a pair of vertically disposed brackets 29 of rectangular form. These brackets are bolted by means of bolts 30 to the transverse bars 6 of elevator 3. The upper surface of shelf 28 is provided with a compressible pad 31 which is preferably of rubber and against which the open side of the box is to be clamped.

For clamping the box against the pad 31, I provide a clamping unit supported by a pair of posts 32. The lower ends of these posts are adjustably threaded into blocks 33 which are secured to the top surface of shelf 28 at the ends thereof. The upper ends of the posts are threaded and slidably receive the sleeves 34 which are secured to and support a bar 35. The sleeves 34 are positioned vertically on the posts 32 by means of nuts 36 threaded on the posts above and below the sleeves.

The bar 35 supports a clamp plate 37 by means of inverted U-shaped clips 38 which have their lower ends secured to the plate and which straddle the bar. The clips 38 are disposed in vertical guides 39 carried by the bar 35. The plate 37 has the depending flanges 40 at its ends. The clips 38 are of sufficient height to permit limited vertical movement of the plate 37 relative to the bar 35. The plate 37 is normally held in its uppermost position against the bar by means of a spring 41 attached to each of the flanges 40 of the plate and to the bar 35 adjacent the sleeve 34.

For moving the plate 37 downwardly into clamping relationship with the box, I provide an eccentric 42 which is pivoted at 43' to the bar 35 and which engages the upper surface of the plate 37. This eccentric is actuated by means of a handle 43.

In using this box supporting and clamping unit, the box is disposed beneath the plate 37 with its open side against the pad 31. The bar 35 is adjusted to a suitable height depending on that of the box. The plate 37 is of such length when it is moved over the box that the flanges 40 will just clear the ends of the box. The plate 37 is moved downwardly against the force of the springs 41 by operating the handle 43. The plate 37 engaging the box 27 tightly clamps it against the pad 31. Thus, the open side of the box will be sealed effectively by the pad 31.

To supply air under pressure within the box, a flexible conduit 44 (Fig. 1) is provided which is connected to an outlet opening 45 (Fig. 5) leading through the self 38 and the pad 31 substantially at the center thereof. This conduit 44 is connected to a manifold air line 46 (Fig. 1) by a suitable fitting including a control valve 47. The manifold 46 is connected by a line 48 to a source of air under pressure. A control valve 49 is provided in the line 48 and a gauge 50 is interposed between the valve 49 and the manifold line 46.

A series of the box supporting and clamping units may be provided on the elevator 3. These units may be of various sizes to receive various size boxes. Each unit will be connected to the manifold 46 by one of the conduits 44.

It will be apparent that in using this apparatus the elevator 3 will be in a raised position and the box supporting and clamping units will receive and clamp the boxes. Then the elevator will be lowered so that the boxes will be submerged in the liquid in the tank 1. Air will be forced into the boxes and if any of the boxes leak, air bubbles will indicate which of the boxes leak.

The apparatus which I have provided is a simple but effective apparatus for testing hollow articles to determine whether or not they are fluid-tight.

The invention described herein may be manufactured and used by or for the Government of the United States of America for Government purposes without the payment of any royalty thereon or therefor.

What I claim is:

1. In apparatus for testing hollow articles each having an open side, a testing frame comprising a base plate, a compressible pad carried by said base plate and on which an open side of one of said articles is adapted to rest, a clamping plate for clamping one of said articles to said pad, said clamping plate being positioned a predetermined distance above said pad, said clamping plate being movable and resiliently biased away from said pad, guide means for maintaining said plate parallel to said pad, a rotatable lever carrying a cam operative to move said clamping plate to secure said article between said clamping plate and said pad, and a flexible conduit opening into said hollow article through said base plate and said pad, said conduit being connected at the other end to a source of gas under pressure.

2. Apparatus for testing hollow articles each having an open side comprising, in combination, a liquid filled testing tank, an elevator mounted within said tank for vertical movement, said elevator including a supporting frame and a plurality of cables, said cables being attached to said frame and extending from said tank, a cylinder and piston unit supported adjacent said tank, said cables being connected to said cylinder and piston unit, means for actuating said cylinder and piston unit to cause movement of said elevator, a testing frame secured to said supporting frame, said testing frame comprising a base plate attached to said supporting frame, a compressible pad carried by said base plate and on which an open side of said articles is caused to rest, a clamping plate for clamping said articles to said pad, said clamping plate being positioned a predetermined distance above said pad, said clamping plate being movable and resiliently biased away from said pad, a rotatable lever carrying a cam operative to move said clamping plate to secure said article between said clamping plate and said pad, means communicating with the interior of said article through said pad and said base plate for supplying gas under pressure to the interior of said article, and means for controlling the flow of said gas under pressure to said article when said article is submerged in said liquid.

EVERETT M. HUNT.

REFERENCES CITED

The following references are of record in the file of this patent:

UNITED STATES PATENTS

| Number | Name | Date |
|---|---|---|
| 330,924 | Reynolds | Nov. 24, 1885 |
| 1,370,437 | Gustafson | Mar. 1, 1921 |
| 1,502,553 | Dozier | July 22, 1924 |
| 1,778,563 | Peck | Oct. 14, 1930 |
| 2,159,063 | Walker | May 23, 1939 |
| 2,231,518 | Boerger | Feb. 11, 1941 |
| 2,408,757 | Dunlop | Oct. 8, 1946 |
| 2,432,814 | Schmidt | Dec. 16, 1947 |